US011538461B1

(12) United States Patent
Gupta et al.

(10) Patent No.: US 11,538,461 B1
(45) Date of Patent: Dec. 27, 2022

(54) LANGUAGE AGNOSTIC MISSING SUBTITLE DETECTION

(71) Applicant: Amazon Technologies, Inc., Seattle, WA (US)

(72) Inventors: Honey Gupta, Patna (IN); Mayank Sharma, Bhopal (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/249,930

(22) Filed: Mar. 18, 2021

(51) Int. Cl.
  *G10L 15/08* (2006.01)
  *G10L 15/16* (2006.01)
  *H04N 21/488* (2011.01)
  *G10L 25/93* (2013.01)

(52) U.S. Cl.
  CPC ............ *G10L 15/083* (2013.01); *G10L 15/16* (2013.01); *G10L 25/93* (2013.01); *H04N 21/4884* (2013.01)

(58) Field of Classification Search
  CPC ....... G10L 15/083; G10L 15/16; G10L 25/93; H04N 21/4884
  See application file for complete search history.

(56) References Cited

U.S. PATENT DOCUMENTS

| 11,205,445 | B1 | 12/2021 | Sharma et al. |
| 2013/0216202 | A1 | 8/2013 | Palakshamurthy et al. |
| 2014/0214416 | A1* | 7/2014 | Yue .......................... G10L 15/14 704/231 |
| 2016/0350655 | A1 | 12/2016 | Weiss et al. |
| 2017/0278525 | A1 | 9/2017 | Wang et al. |
| 2019/0095464 | A1 | 3/2019 | Xie et al. |
| 2019/0318755 | A1 | 10/2019 | Tashev et al. |
| 2019/0354836 | A1 | 11/2019 | Shah et al. |
| 2020/0126538 | A1* | 4/2020 | Han ........................ G10L 15/22 |
| 2020/0293653 | A1 | 9/2020 | Huang et al. |
| 2020/0365134 | A1* | 11/2020 | Tu .......................... G10L 15/1815 |
| 2021/0204033 | A1* | 7/2021 | Maurice .............. H04N 21/242 |
| 2021/0327405 | A1* | 10/2021 | Chae ...................... G10L 13/08 |

(Continued)

OTHER PUBLICATIONS

U.S. Appl. No. 16/436,351, filed Jun. 10, 2019, Sharma et al.

(Continued)

*Primary Examiner* — Bhavesh M Mehta
*Assistant Examiner* — Edward Tracy, Jr.
(74) *Attorney, Agent, or Firm* — Weaver Austin Villeneuve & Sampson LLP

(57) ABSTRACT

Some implementations include methods for detecting missing subtitles associated with a media presentation and may include receiving an audio component and a subtitle component associated with a media presentation, the audio component including an audio sequence, the audio sequence divided into a plurality of audio segments; evaluating the plurality of audio segments using a combination of a recurrent neural network and a convolutional neural network to identify refined speech segments associated with the audio sequence, the recurrent neural network trained based on a plurality of languages, the convolutional neural network trained based on a plurality of categories of sound; determining timestamps associated with the identified refined speech segments; and determining missing subtitles based on the timestamps associated with the identified refined speech segments and timestamps associated with subtitles included in the subtitle component.

19 Claims, 10 Drawing Sheets

(56) References Cited

U.S. PATENT DOCUMENTS

2021/0407492 A1* 12/2021 Chang .................... G10K 15/02
2021/0407510 A1* 12/2021 Wang .................... G06V 40/20

OTHER PUBLICATIONS

Non-Final Office Action dated Apr. 6, 2021 in U.S. Appl. No. 16/436,351.
Notice of Allowance dated Aug. 20, 2021 in U.S. Appl. No. 16/436,351.

* cited by examiner

'applause', 'bang', 'bark', 'beep', 'blare', 'bleat', 'breathe heavily', 'burp', 'buzz', 'chant', 'chatter', 'cheer', 'chime', 'chirp', 'clank', 'clap', 'clatter', 'clear throat', 'click', 'clink', 'cluck', 'coo', 'cough', 'crack', 'crackle', 'creak', 'croak', 'cry', 'dial', 'ding', 'door_or_drawer_open_or_close', 'drill', 'echo', 'engine', 'exclaim', 'exhale', 'explosion', 'fart', 'flapping', 'footstep', 'gasp', 'groan', 'growl', 'grumble', 'grunt', 'gunfire', 'helicopter', 'hiccup', 'hiss', 'honk', 'howl', 'hum', 'inhale or exhale', 'instrument-play', 'jingle', 'knock', 'laugh', 'meow', 'moan', 'moo', 'mosquito', 'muffle', 'music', 'mutter', 'neigh', 'noise', 'not_a_caption', 'oink', 'others', 'pant', 'pop', 'quack', 'rain', 'rattle', 'revving', 'ring', 'roar', 'rumble', 'rustle', 'scoff', 'scream', 'screech', 'shatter', 'shiver', 'sigh', 'silence', 'siren', 'sizzle', 'snap', 'snarl', 'sneeze', 'sniff', 'snore', 'snort', 'sob', 'song', 'spit', 'squawk', 'squeak', 'squeal', 'static', 'talk', 'thud', 'tick', 'toll', 'tone', 'traffic', 'trill', 'type', 'water run', 'waves', 'whimper', 'whine', 'whirr', 'whisper', 'whistle', 'whoop_or_whoosh', 'wind', 'yell', 'yelp'

*FIG. 2B*

LANGUAGE AGNOSTIC MISSING SUBTITLE DETECTION

BACKGROUND

Media presentation, such as movies and television shows, may have subtitles. The subtitles may be textual transcriptions of the words spoken by characters appearing in the content. Typically, the subtitles are transcribed by human based on the audio segments associated with the content. During the transcription process, errors may occur causing the subtitles to be missing. For example, an audio segment mainly in English may include some foreign dialogs, and the foreign dialogs may not get transcribed into subtitles. Missing subtitles during a content playback may cause viewers to have an unpleasant viewing experience.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

FIG. 2B shows an example of the different categories that the AC network may classify, in accordance with some implementations.

DETAILED DESCRIPTION

Figure 1A:
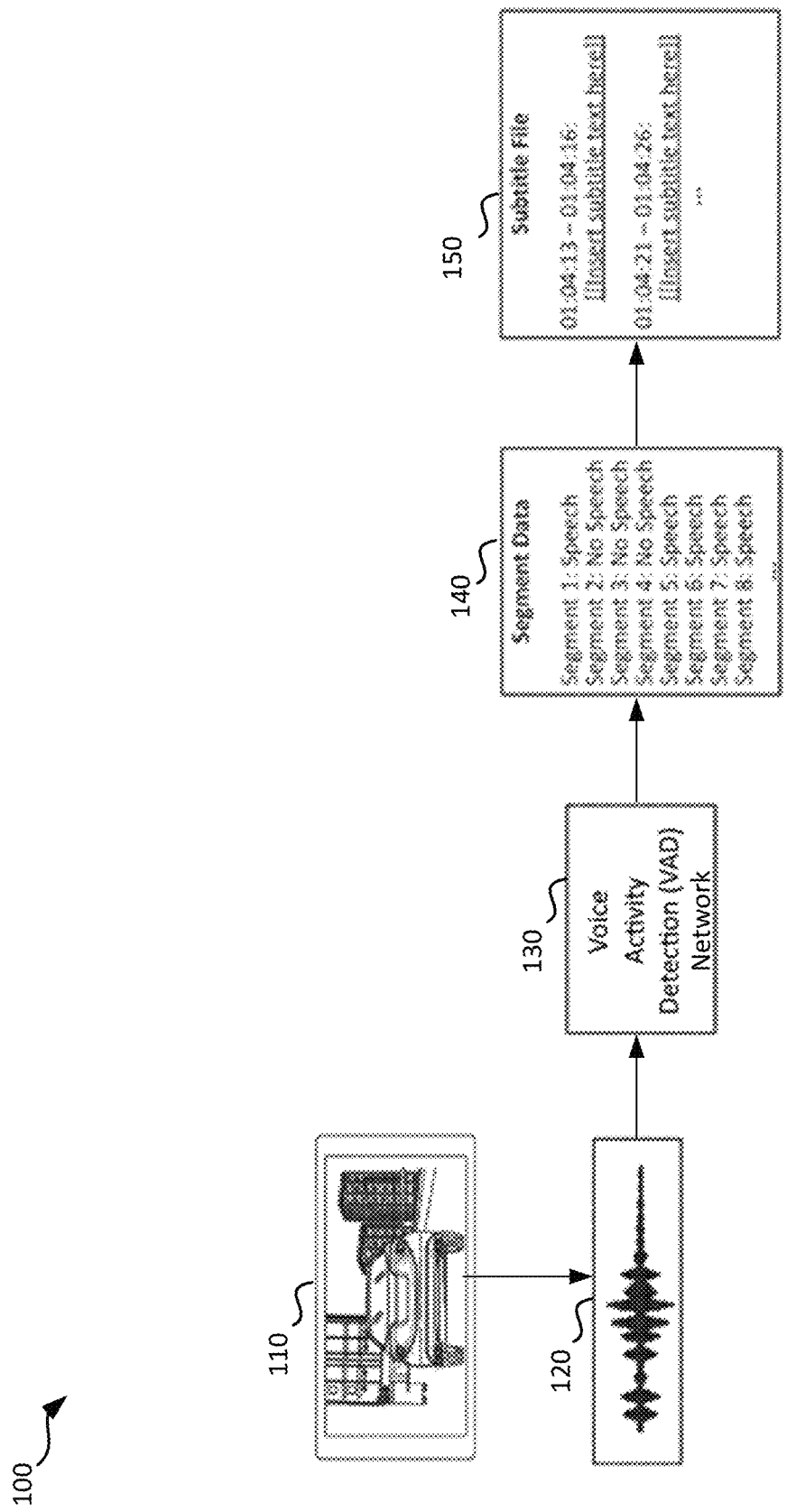
FIG. 1A shows an example block diagram of a voice activity detection (VAD) network, in accordance with some implementations.

This disclosure describes techniques for identifying missing subtitles associated with a media presentation. The media presentation may include an audio component and a subtitle component. The subtitle component may include timestamps associated with subtitles. The techniques may include receiving an audio sequence associated with the audio component. The audio sequence may be divided into a plurality of audio segments of a first duration. For example, the first duration may be 800 milliseconds (ms). Each of the audio segments may be processed using voice activity detection (VAD) network to determine whether an audio segment is a speech segment. The VAD network may be configured to perform operations associated with a recurrent neural network. The VAD network may be trained to detect speech. The VAD network may be trained based on a plurality of different languages and a plurality of samples. The VAD network may be language agnostic.

The VAD network may be configured to perform operations associated with generating values that may be interpreted as probabilities for speech or non-speech. A first probability threshold value may be used. For example, a first probability threshold value may be 0.5. A probability of equal to or greater than 0.5 may indicate that an audio segment is a speech segment, while a probability of less than 0.5 may indicate that an audio segment is not a speech segment. When an audio segment is identified to be a speech segment, timestamps may be used to indicate a beginning of the audio segment and an end of the audio segment. The timestamps associated with the audio segments that are identified to be speech segments may be stored. The timestamps may be used to indicate that the audio segments associated with the timestamps may require subtitles. It may be possible that some audio segments may be mis-identified by the VAD network as speech segments. For example, the VAD network may identify an audio segment that includes someone coughing as a speech segment. This may be referred to as a false positive.

For some implementations, the audio segments that are identified as the speech segments by the VAD network may be further processed using an audio classification (AC) network configured to classify sounds into a plurality of categories of sound. For example, the plurality of categories of sound may include "dog barking", "door closing", "music", "song", "groan", "sigh", "cough", "exhale", etc. The AC network may be language agnostic. The AC network may be used to filter out sounds (e.g., cough) that the VAD network may falsely identify as speech.

Multiple consecutive speech segments identified by the VAD network may be combined to form a plurality of combined speech segments. For some implementations, each of the plurality of combined speech segments may have a second duration. For example, the second duration may be 2 seconds. The second duration may be longer than the first duration. The plurality of combined speech segments may be used as input to the AC network. The AC network may be configured to receive each of the combined speech segments and classify the sound associated with each of the combined speech segments into a category of sound. For some implementations, the AC network may be configured to perform operations associated with a convolutional neural network.

The AC network may be configured to perform operations associated with generating values that may be interpreted as probabilities for categories of sound. A second probability threshold value may be used. For example, a second probability threshold may be 0.6, and a probability of equal or greater than 0.6 for a combined speech segment classified by the AC network as "cough" may indicate that the combined speech segment is more likely to be non-speech, while a probability of less than 0.6 may indicate that the combined speech segment is less likely to be non-speech. When a combined speech segment is identified by the AC network as more likely to be speech, the timestamps associated with the combined speech segment may be used to compare with the timestamps included in a subtitle component, and missing subtitles may be identified.

Examples of systems and methods associated with identifying missing subtitles associated with a media presentation will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

The disclosed implementations may include a computer-implemented method for identifying missing subtitles, the method may include receiving a media presentation including a video component, an audio component, and a subtitle component, the audio component including timestamps associated with an audio sequence, and the subtitle component including timestamps associated with subtitles; extracting the audio sequence from the media presentation; dividing the audio sequence into a plurality of audio segments having a first duration; evaluating each of the plurality of audio segments using a recurrent neural network to identify speech segments and non-speech segments from the plurality of audio segments; combining consecutive speech segments to form a plurality of combined speech segments having a second duration; classifying each of the plurality of combined speech segments using a convolutional neural network to a category of sound from a plurality of categories of sound; based on the classifying by the convolutional neural network, identifying one or more of the combined speech segments as speech; determining timestamps associated with the one or more combined speech segments identified by the convolutional neural network as speech; and generating a notification indicating missing subtitles from the subtitle component based on the timestamps associated with the one or more combined speech segments identified by the convolutional neural network as speech not specified as the timestamps associated with the subtitle component.

Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1A shows an example block diagram of a voice activity detection (VAD) network, in accordance with some implementations. As shown in diagram 100, media presentation 110 may be movie, television show, or any other suitable media presentation. The media presentation 110 may be included in a catalog of media presentation. The media presentation 110 may include an audio sequence 120. The audio sequence 120 may be extracted from the media presentation 110 and may be used as input to a VAD network 130. The VAD network 130 may be configured to detect speech and non-speech included in the audio sequence 120. For some implementations, the VAD network 130 may be a gated recurrent neural network.

The VAD network 130 may be configured to divide the audio sequence 120 into a plurality of audio segments 140, including audio segments that include the speech. The voice activity detection network 130 may be configured to determine timestamps associated with the audio segments that are determined to include the speech. The voice activity detection network 130 may also be configured to determine timestamps associated with the audio segments that are determined to include non-speech. The timestamps associated with the audio segments determined to include the speech may be stored and used to determine when in the audio sequence the subtitles are to be generated. The subtitles may be generated by human.

Figure 1B:
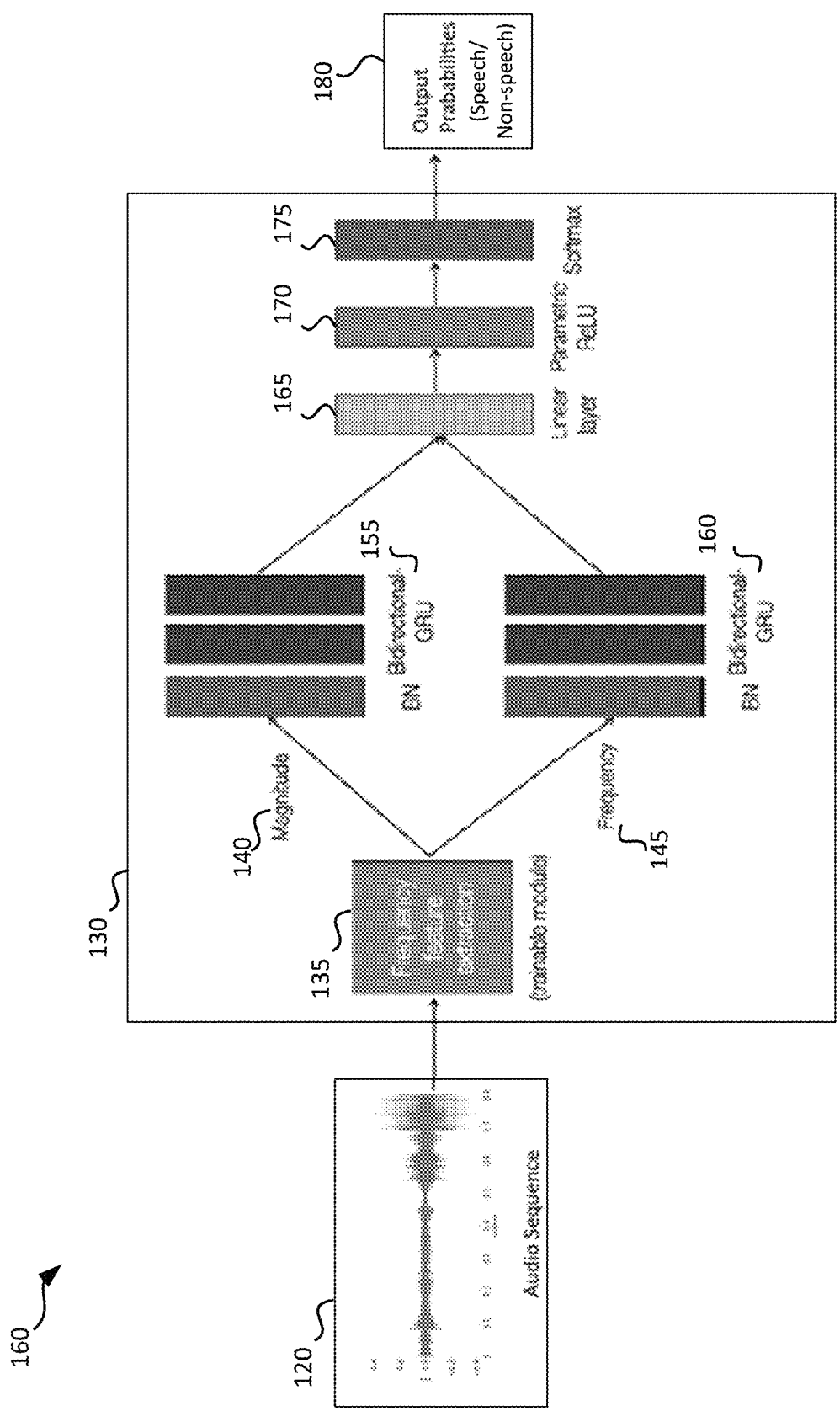
FIG. 1B shows another example block diagram of a VAD, in accordance with some implementations.

FIG. 1B shows another example block diagram of a VAD, in accordance with some implementations. As shown in diagram 160, the audio sequence 120 may be used as input to the recurrent neural network 130. The audio sequence 120 may be divided into multiple audio segments of a certain duration (also referred to as a first duration). For example, the first duration may be 800 milliseconds (ms). The recurrent neural network 130 may include a frequency feature extraction module 135 configured to generate a magnitude feature 140 of the audio segment and a frequency feature 145 of the audio segment. For example, the magnitude feature 140 of the audio segment may be associated with mel spectrogram, and the frequency feature 145 of the audio segment may be associated with instantaneous frequencies.

For each of the audio segments, the magnitude feature 140 may be used as input to one batch normalization (BN) gated recurrent unit (GRU) 155 of the recurrent neural network 130, and the frequency feature 145 may be used as input to another BN-GRU 160 of the recurrent neural network 130. The output from the two BN-GRU 155 and 160 may be combined. For example, the output from the BN-GRU 160 may be concatenated to the output of the BN-GRU 155. The combined output may then be used as input to a fully-connected layer 165, followed by a parametric rectified linear unit (PReLU) activation 170 and followed by a softmax layer 175. The output 180 from the softmax layer 175 may include information related to a probability whether an audio segment is a speech segment. An average of the probabilities associated with multiple audio segments may be obtained. This may be because of the overlaps of the multiple audio segments. The average of the probabilities may then be used to determine whether an audio segment is speech or non-speech. A detailed description of some neural voice activity detection implementations using a gated recurrent unit neural network is discussed in commonly assigned U.S. patent application Ser. No. 16/436,351, titled "LANGUAGE AGNOSTIC AUTOMATED VOICE ACTIVITY DETECTION", by Mayank Sharma et al., filed Jun. 10, 2019, which is hereby incorporated by reference in its entirety and for all purposes.

Figure 2A:
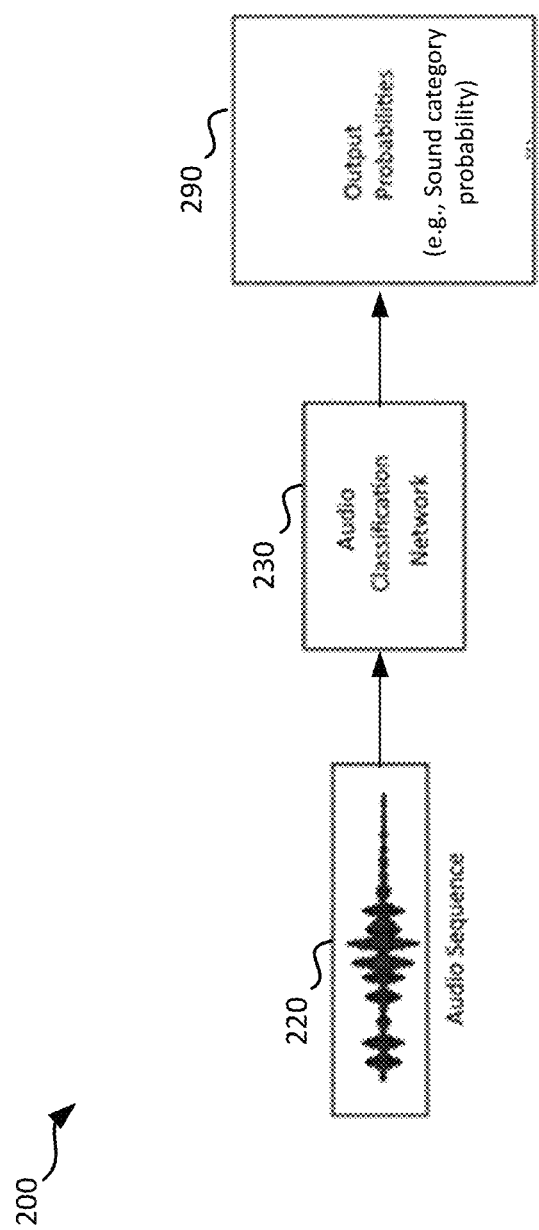
FIG. 2A shows an example block diagram of an audio classification (AC) network, in accordance with some implementations.

FIG. 2A shows an example block diagram of an audio classification (AC) network, in accordance with some implementations. As shown in diagram 200, an audio sequence 220 may be associated with a media presentation and may be used as input to the AC network 230. The audio sequence 220 may be divided into a plurality of audio segments having equal duration (also referred to as a second duration). For example, the second duration may be 2 seconds. It may be noted that the second duration (e.g., 2 seconds) is longer than the first duration (e.g., 800 ms). The difference in durations may be because the human sound can be detected with a short context (e.g., 800 ms), while other sounds require longer context (e.g., 2 seconds). For some implementations, there may be an overlap between two consecutive audio segments associated with the AC network 230. The AC network 230 may be configured to classify the audio segments to different sound categories. For some implementations, the AC network 230 may be a convolutional neural network.

The AC network 230 may be executed by one or more remote servers and/or at a computer system or across a distributed computing environment. The AC network 230 may be trained to classify a plurality of categories of sound. FIG. 2B shows an example of the different categories that the audio classification network may be configured to classify based on the input audio segments. The AC network 230 may be configured to generate an output probability 290 for a category of sound. For example, an output probability of 0.8 for a "bark" category may be interpreted that the input sound is more likely to be the "bark" sound. That output probability may also be interpreted that the input sound is less likely to be speech. An output probability of 0.2 for a "bark" category may be interpreted that the input sound is less likely to be the "bark" sound. A probability threshold value may be used to compare with the output probability 290.

Figure 2C:
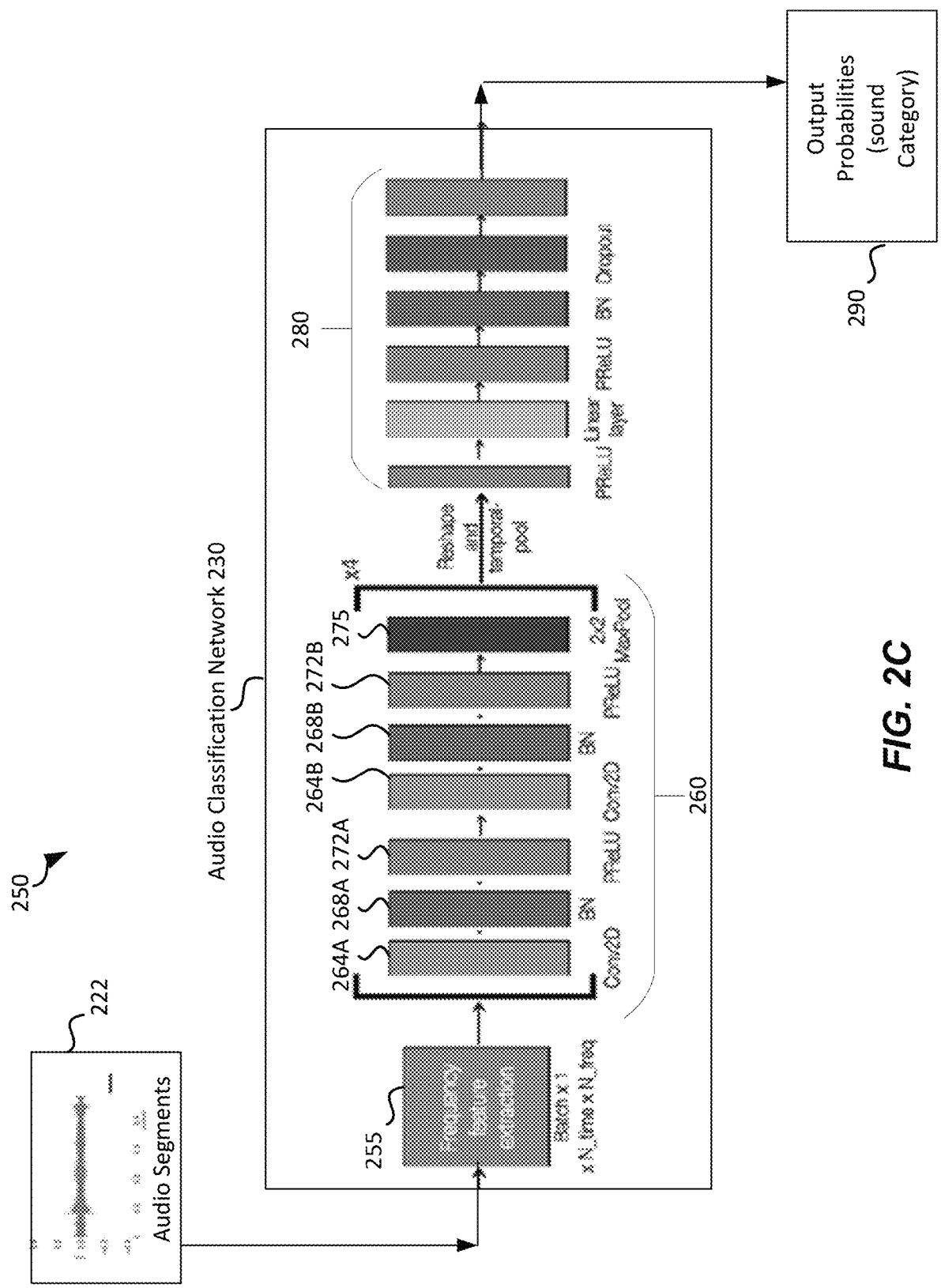
FIG. 2C shows another example block diagram of an audio classification network, in accordance with some implementations.

FIG. 2C shows another example block diagram of an audio classification network, in accordance with some implementations. As shown in diagram 250, the audio classification network 230 may be configured to receive a plurality of audio segments 222. The plurality of audio segments 222 may be associated with an audio sequence such as, for example, the audio sequence 220 (shown in FIG. 2A). The audio classification network 230 may be configured to include a frequency feature extraction 255, followed by four convolutional blocks 260, and followed by a fully-connected layers 280. As shown in diagram 250, each of the convolutional block of the four convolutional blocks 260 may include pair of 2D convolutional layers 264A and 264B, followed by batch-normal (BN) layer 268A and 268B, and PReLU activation layer 272A and 272B. The last layer of each block contains a 2×2 max-pooling layer 275 for spatial feature-reduction. The output of the audio classification network 230 is the class-wise output probability 290 for each of the audio segments 222. An average of the output probabilities of multiple audio segments may be used based on the situation when there is an overlap between consecutive audio segments 222.

Figure 3:
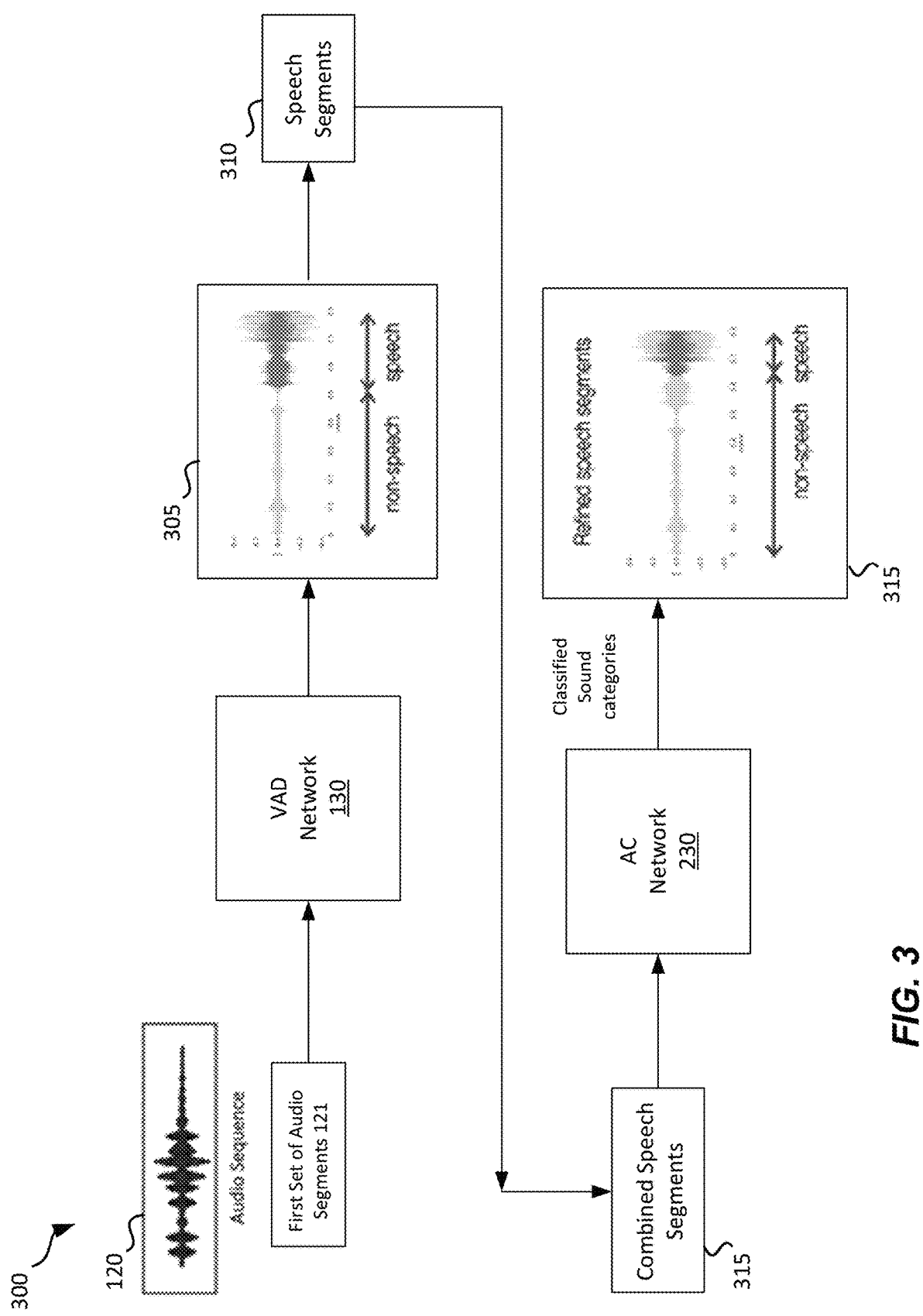
FIG. 3 shows an example block diagram of a missing subtitle detection network implemented using a VAD network in sequence with an AC network, in accordance with some implementations.

FIG. 3 shows an example block diagram of a missing subtitle detection network implemented using a VAD network in sequence with an AC network, in accordance with some implementations. As shown in diagram 300, a missing subtitle detection network may be configured to include a VAD network 130 in sequence with an AC network 230 such that an output of the VAD network 130 may be used as an input to the AC network 230. The VAD network 130 may be configured to receive audio segments from a first set of audio segments 121 that are generated from the audio sequence 120. The audio segments from the first set of audio segments 121 may have similar duration (e.g., 800 ms). There may be an overlap between consecutive audio segments from the first set of audio segments. For example, when the audio sequence 120 is 8 seconds long, and when the duration of each audio segment from the first set of audio segments 121 is 800 ms with 90% overlap between consecutive audio segments, there may be 100 audio segments. A sliding window approach may be used to identify each audio segment from the audio sequence 120. Each of the audio segments from the first set of audio segments 121 may be processed by the VAD network 130 to generate an output probability for speech or non-speech (also referred to as speech or non-speech). In the current example, since there may be 100 audio segments, there may be an output probability for each of the audio segments forming a vector of output probabilities, one for each 80 ms of the audio sequence 120. The VAD network 130 may be configured to perform operations to remove spurious outputs (e.g., noises) from the probability vector. The output probabilities in the probability vector may be used by the VAD network 130 to compare against a first probability threshold value to identify speech segments. For example, when the output probability of an audio segment is 0.7 and the probability threshold value is 0.5, then the audio segment may be identified as a speech segment. It may be possible that the VAD 130 may mis-identify certain sound (e.g., sigh) as speech. To prevent this situation, the missing subtitle network may be configured to filter the speech segments identified by the VAD network 130 to remove those mis-identified as speech segments.

For some implementations, consecutive speech segments 310 may be combined to generate combined speech segments 315 of similar duration (e.g., 2 seconds). Each of the combined speech segments 315 may be used as input to the AC network 230. The AC network 230 may be trained to recognize different categories of sound. An example of the different categories of sound is shown in FIG. 2B. The AC network 230 may be configured to identify or predict a category of sound and determine an output probability for the predicted category of sound for each of the combined speech segments. For example, a combined speech segment may be predicted as the "music" category of sound with an output probability of 0.7. For some implementations, a set of categories of sounds from all the categories of sound capable of being recognized by the AC network 230 may be used. For example, the set of categories of sound may include "music", "song", "instrument-play", "groan", "inhale or exhale", "sigh", "clear throat", "breathe heavily", "grunt", "cough", "gasp" and "exhale". This set of categories of sound may be referred to as a first set. For some implementations, the AC network 230 may be configured to use a second threshold probability value to compare against an output probability generated by the AC network 230. When a combined speech segment is predicted by the AC network 230 as a category of sound included in the first set, the output probability associated with the combined speech segment may be compared with the second threshold probability value. For example, when the output probability of the combined speech segment is 0.7 and the second probability threshold value is 0.5, then the combined speech segment may be filtered because it is more likely to be music and not speech. The combined speech segments that are not filtered as non-speech may be referred to as refined speech segments. For some implementations, the combined speech segments that are not filtered as non-speech may then be used to detect missing subtitles based on the timestamps associated with these combined speech segments and the timestamps associated with the subtitles in a subtitle component associated with the audio sequence 120.

Figure 4:
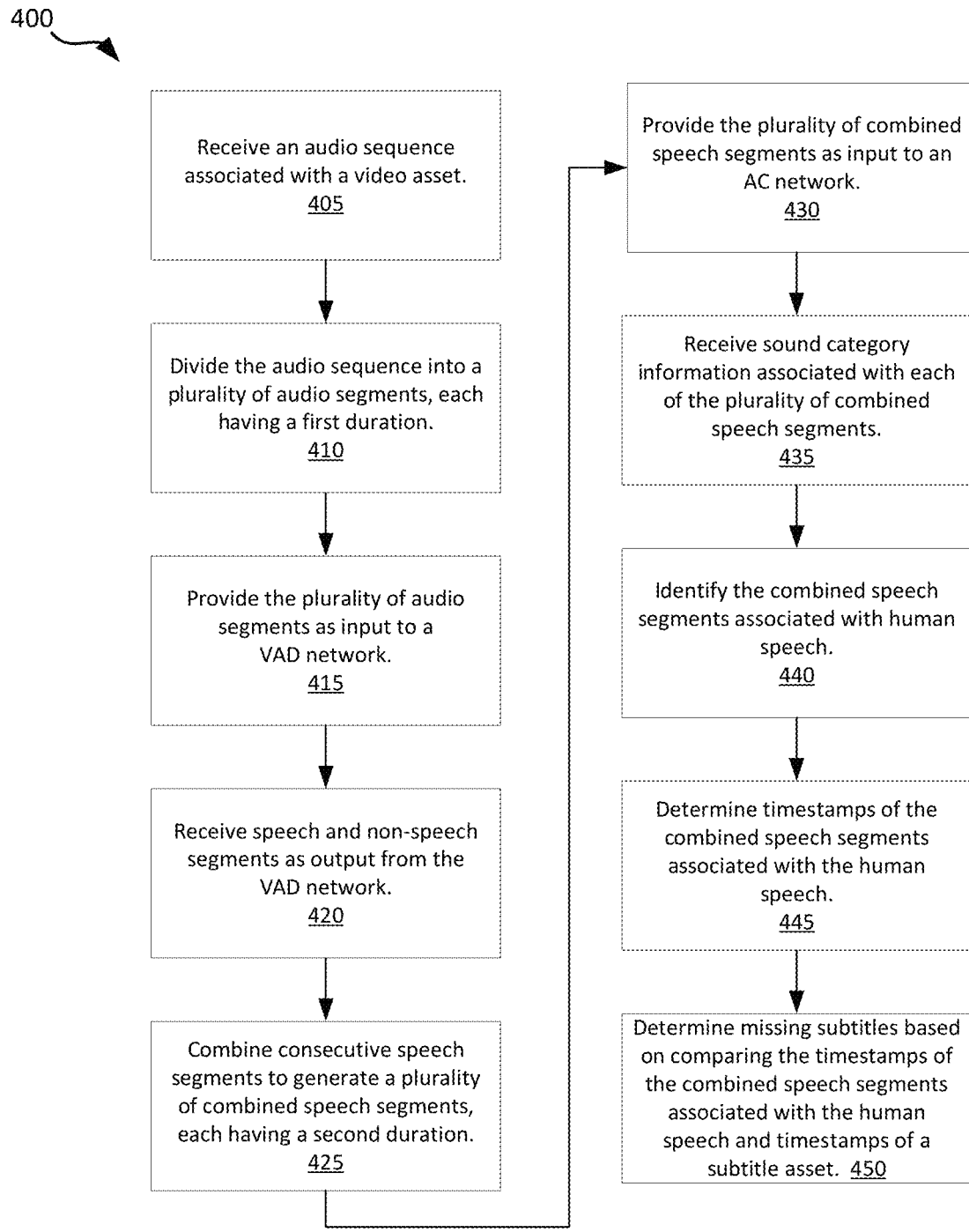
FIG. 4 shows an example flow diagram of a missing subtitle detection process implemented using a VAD network in sequence with an AC network, in accordance with some implementations.

FIG. 4 shows an example flow diagram of a missing subtitle detection process implemented using a VAD network in sequence with an AC network, in accordance with some implementations. The process may be associated with computer-executable instructions stored on a memory of a device, such as a remote server or a user device, and the instructions may be executed to determine missing subtitles associated with the subtitle component.

As shown in diagram 400, the process may start at block 405 where an audio sequence associated with an audio component may be received. The audio component may be associated with a media presentation. The media presentation may be associated with a catalog of media presentation. The media presentation may include a subtitle component that may include subtitles that correspond to dialogs included in the audio sequence. The subtitle component may include timestamps to indicate where subtitles may need to be generated.

At block 410, the audio sequence may be divided into a plurality of audio segments. Each of the audio segments may have a first duration (e.g., 800 ms). At block 415, the audio segments may be used as input to a VAD network such as, for example, the VAD network 130 shown in FIG. 3. The VAD network may evaluate the audio segments and determine output probabilities for each audio segment as related to speech or non-speech. The output probability associated with the VAD network may then be used to compare with a first probability threshold value to identify an audio segment as speech or non-speech, as shown in block 420. At block 425, the audio segments that are identified as speech segments may then combined to form combined speech segments. Each of the combined speech segments may have similar duration. At block 430, the combined speech segments may be used as input to an AC network. At block 435, the combined speech segments may be processed by the AC network. This may include predicting a category of sound for each of the combined speech segment and determining a probability that the combined speech segment includes the sound associated with the predicted category of sound. The combined speech segments that are not filtered may then be predicted as including speech, as shown in block 440. At block 445, timestamps associated with these combined speech segments may be identified. At block 450, the timestamps associated with the combined speech segments from block 445 may be compared with the timestamps associated with the subtitles in the subtitle component to determine missing subtitles.

Figure 5:
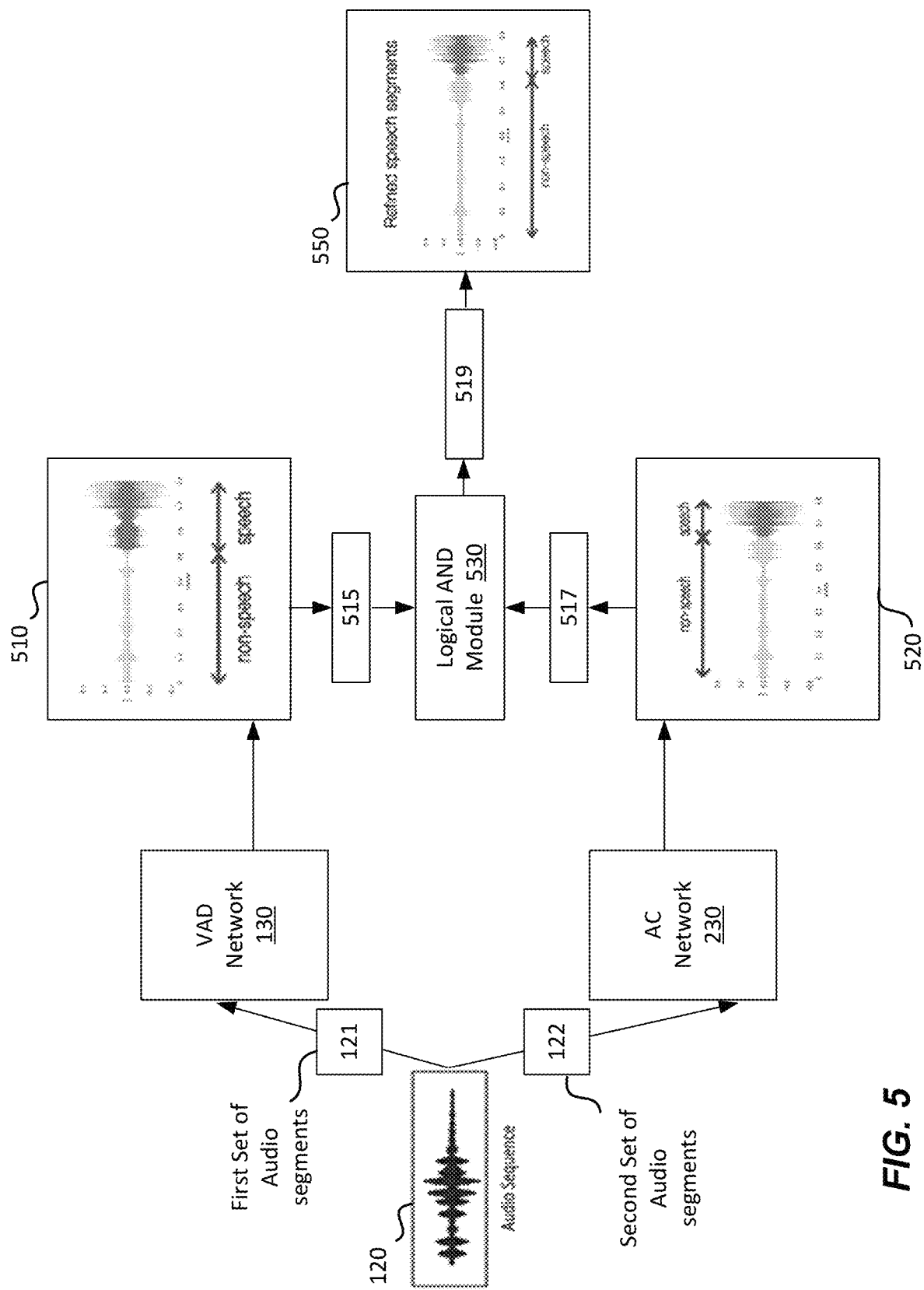
FIG. 5 shows an example block diagram of a missing subtitle detection network implemented using a VAD network in parallel with or independent of an AC network, in accordance with some implementations.

FIG. 5 shows an example block diagram of a missing subtitle detection network implemented using a VAD network in parallel with or independent of an AC network, in accordance with some implementations. As shown in diagram 500, a missing subtitle detection network may be configured to include a VAD network 130 in parallel with or independent of an AC network 230. The predictions generated by the VAD network 130 may be combined with the prediction from the AC network 230 to generate a combined prediction whether an audio segment is speech or non-speech. It may be noted that this parallel approach is different from the sequential approach described with FIG. 3 and FIG. 4 in that the AC network 230 in the sequential approach is used to filter the output of the VAD network 130.

The VAD network 130 may be configured to receive a first set of audio segments 121 that are generated from the audio sequence 120. The first set of audio segments 121 may have similar duration (e.g., 800 ms). There may be an overlap between consecutive audio segments in the first set of audio segments 121. For example, when the audio sequence 120 is 8 seconds long, and when the duration of each audio segment in the first set of audio segments 121 is 800 ms with 90% overlap between consecutive audio segments in the first set of audio segments 121, there may be 100 audio segments. Each of the audio segments in the first set of audio segments 121 may be processed by the VAD network 130 to generate an output probability for speech or non-speech. In the current example, since there may be 100 audio segments in the first set of audio segments 121, there may be an output probability for each of the audio segments in the first set of audio segments 121 forming a vector of output probabilities, one for each 800 ms of the audio sequence 120. The VAD network 130 may be configured to perform operations to remove spurious outputs (e.g., noises) from the probability vector. The output probabilities in the probability vector may be used by the VAD network 130 to compare against a first probability threshold value to identify speech segments and non-speech segments 405. For example, when the output probability of an audio segment in the first set of audio segments 121 is 0.7 and the probability threshold value is 0.5, then that audio segment may be identified or predicted as a speech segment.

The speech and non-speech predictions 510 resulting from the operations of the VAD network 130 may enable predicting where there is speech, and where there is non-speech during the entire audio sequence 120. For some implementations, a first array 515 may be generated to store information associated with the predictions by the VAD network 130. The first array 515 may be configured to store binary values. For example, the value "1" may be used to represent speech, and the value "0" may be used to represent non-speech. Each binary value associated with the first array 515 may be used to represent a segment of the audio sequence 120. The segments associated with the binary values may be consecutive and non-overlapping and may have similar duration. For example, a segment associated with a binary value of the first array 515 may have a duration of one thousand milliseconds.

For some implementations, the audio sequence 120 may be divided into a second set of audio segments 122 of similar duration (e.g., 2 seconds). It may be noted that the audio segments in the second set of audio segments 122 may have longer duration than the audio segments in the first set of audio segments 121. The longer duration may be useful for the AC network 230 to be able to identify and categorize the type of speech as compared to the VAD network 130 where the operations may include identifying whether an audio segment is speech or non-speech. It may also be noted that the operations of the AC network 230 shown in FIG. 5 may apply to the entire audio sequence 120. This is different from the operation of the AC network 230 shown in FIG. 3 and FIG. 4 where the operations of the AC network 230 may apply only to the audio segments predicted by the VAD network 130 as speech.

Each of the audio segments in the second set of audio segments 122 may be used as input to the AC network 230. The AC network 230 may be configured to predict a category of sound and determine an output probability for the predicted category of sound for each of the audio segments in the second set of audio segments 122. For example, an audio segment from the second set of audio segments 122 may be predicted as the "applause" category of sound with an output probability of 0.65. The output probability may then be used to compare with a second threshold probability value to determine whether the audio segment is more or less likely to be an "applause" sound. For example, when the second probability threshold value is 0.6, then the audio segment is identified or predicted to be an "applause" and therefore is non-speech.

The speech and non-speech predictions 520 resulting from the operations of the AV network 230 may enable predicting where there is speech, and where there is non-speech during the entire audio sequence 120. A second array 517 may be generated to store the predictions by the AC network 230. The second array 517 may be configured to store binary values similar to the first array associated with the VAD 130. Each binary value associated with the second array 517 may be used to represent a segment of the audio sequence 120. The segments associated with the binary values may be consecutive and non-overlapping and may have similar duration. For example, a segment associated with a binary value of the second array 517 may have a duration of one thousand milliseconds. For some implementations a duration associated with a binary value of the first array 515 is similar to the duration associated with a binary value of the second array 517 such that a segment of the audio sequence 120 may be associated with the same cell of the first array 515 and of the second array 517.

For some implementations, a logical AND module 530 may be used to combine the binary values of the first array 515 with the binary values of the second array 517 such that there is a speech segment when the cell values corresponding to the same segment are "1" and no-speech when at least one of the two cell values corresponding to the same segment is "0". For some implementations, the logical AND module 530 may be configured to generate a third array 519 to store the binary value results of the AND operations of the first array 515 and the second array 517. The binary values in the third array 519 may be used to identify the refined speech and non-speech segments in the audio sequence 120 based on combining the binary values stored in the first array 515 and the second array 517. Timestamps may be determined based on the binary values stored in the third array 519. Missing subtitles may be detected based on the timestamps associated with the third array 519 and the timestamps associated with the subtitles in a subtitle component associated with the audio sequence 120.

Figure 6:
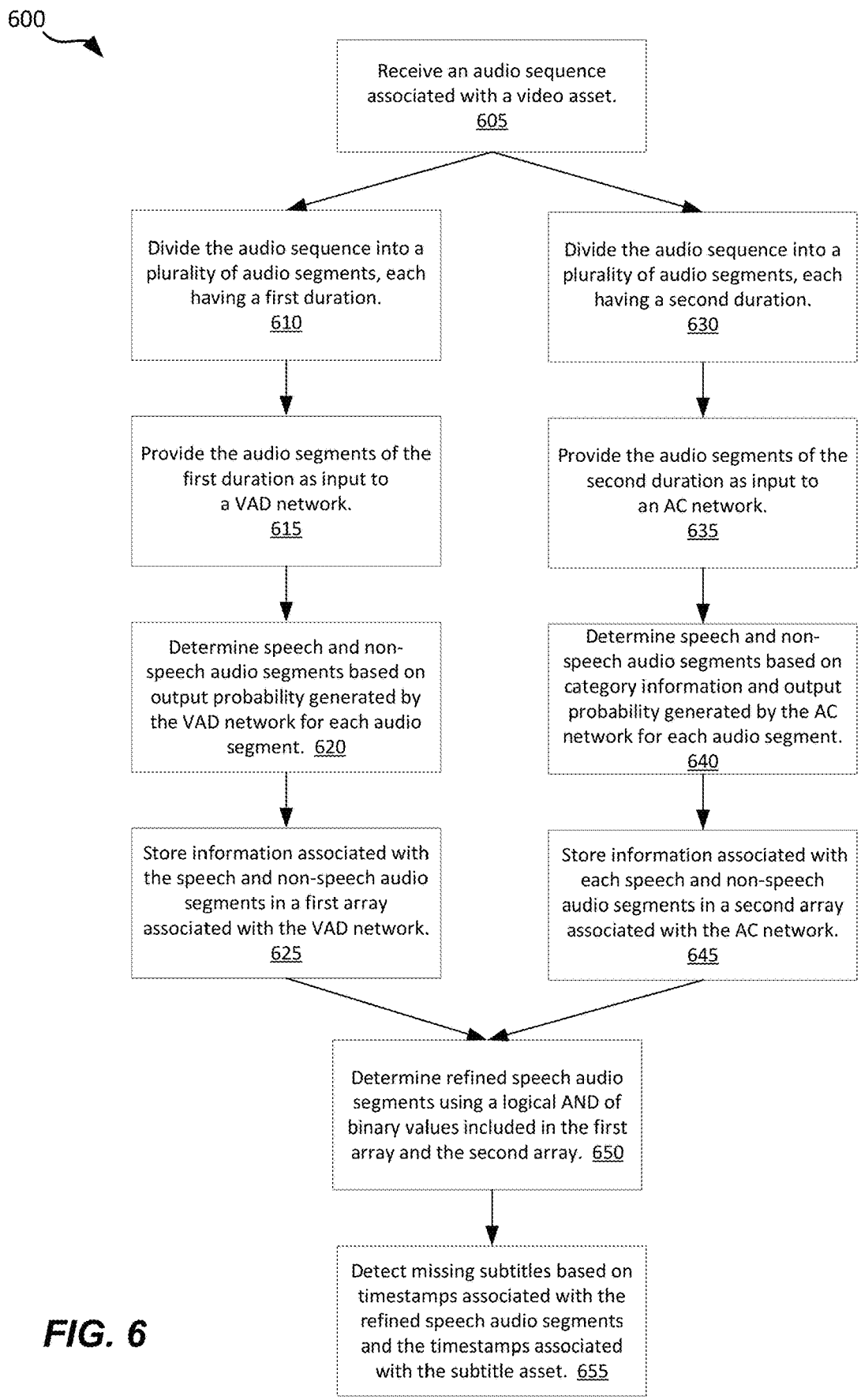
FIG. 6 shows an example flow diagram of a missing subtitle detection process implemented using a VAD network in parallel with or independent of an AC network, in accordance with some implementations.

FIG. 6 shows an example flow diagram of a missing subtitle detection process implemented using a VAD network in parallel with or independent of an AC network, in accordance with some implementations. The process may be associated with computer-executable instructions stored on a memory of a device, such as a remote server or a user device, and the instructions may be executed to determine missing subtitles associated with the subtitle component.

As shown in diagram 600, the process may start at block 605 where an audio sequence associated with an audio component may be received. The audio component may be associated with a media presentation. The media presentation may be associated with a catalog that may be configured to include a plurality of media presentation. The media presentation may include a subtitle component may include subtitles that correspond to dialogs included in the audio sequence. The subtitle component may include timestamps to indicate where subtitles may need to be generated.

At block 610, the audio sequence may be divided into a plurality of audio segments. Each of the audio segments may have a first duration (e.g., 800 ms). At block 615, the audio segments may be used as input to a VAD network such as, for example, the VAD network 130 shown in (FIG. 1B). The VAD network may evaluate the audio segments and determine output probabilities for each audio segment as related to speech or non-speech. The output probability associated with the VAD network may then be used to compare with a first probability threshold value to identify an audio segment as speech or non-speech, as shown in block 620. At block 625, information about the speech and non-speech segments that are identified or predicted by the VAD network may be stored in a first array. The information may be stored using binary values, with one binary value representing an audio segment as speech, and the other binary value representing the audio segment as non-speech. The information stored in the first array may be used as input to the operations of block 650. It may be noted that the audio segments associated with the binary values may be consecutive and non-overlapping and may have similar duration. For example, a segment associated with a binary value of the first array 515 may have a third duration. For example, the third duration may be one thousand milliseconds. The third duration may be used so that the same audio segment duration may be used as input to the operations of block 650.

Referring to block 605, for some implementations, independent of the operations associated with the VAD network 130, the audio sequence received in block 605 may be processed by an AC network such as, for example, the AC network 230 (shown in FIG. 2C). At block 630, the audio sequence received in block 605 may be divided into a plurality of audio segments, each having a second duration (e.g., 2 seconds). At block 635, the audio segments may be provided as input to the AC network. At block 640, the AC network may classify each audio segment to a category of sound and may generate an output probability indicating a likelihood that the audio segment includes the sound associated with the category of sound. The output probability may be compared against a second probability threshold value. For example, when the output probability is higher than the second probability threshold value, the audio segment may be considered non-speech. Those audio segments that are not filtered out as non-speech may be identified as speech. At block 645, information associated with the speech and non-speech segments may be stored in a second array. The information may be stored using binary values, with one binary value representing an audio segment as speech, and the other binary value representing the audio segment as non-speech. It may be noted that the audio segments associated with the binary values may be consecutive and non-overlapping and may have similar duration as the audio segments associated with the first array. For example, a segment associated with a binary value of the second array may have a third duration. The information stored in the second array may be used as input to the operations of block 650.

At block 650, the binary values in the first array 515 and in the second array 517 may be used to generate a result that may provide better prediction as compared to using only the results associated with the operations of the VAD network 130. The operations in block 650 may include performing a logical AND operation of the binary values associated with each cell of the first array 515 and of the second array 517. For example, when a cell corresponding to an audio segment associated with the VAD network 130 has a binary value of "1" and a cell corresponding to the same audio segment associated with the AC network also has a value of "1", then that audio segment may be predicted as speech. Any other combination of values for both cells may result in the audio segment predicted as non-speech. At block 655, missing subtitles may be determined based on comparing the timestamps associated with the audio segments predicted as speech with the timestamps associated with the subtitles included in the subtitle component.

Figure 7:
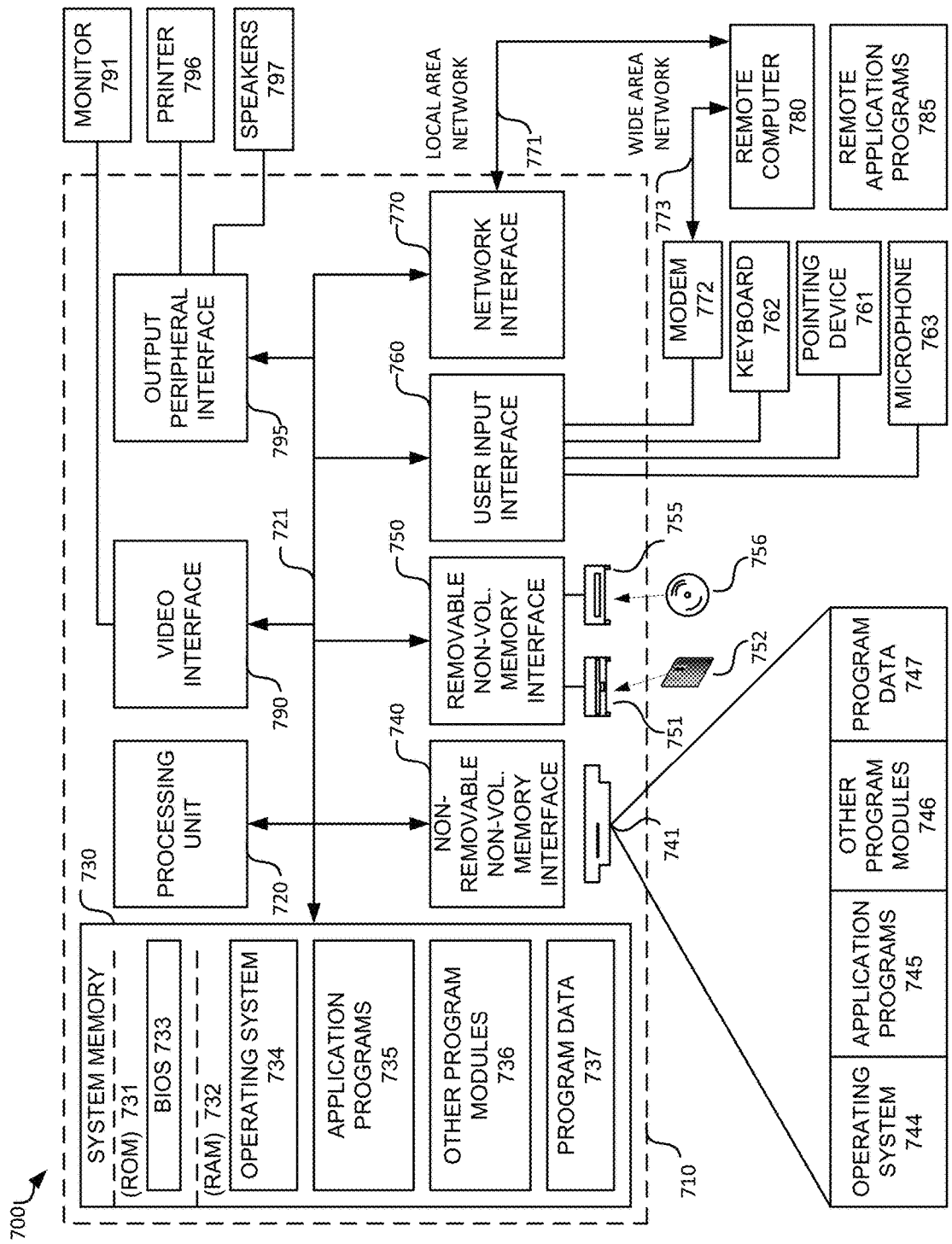
FIG. 7 shows a diagram of an example computing system that may be used with some implementations.

FIG. 7 shows a diagram of an example computing system that may be used with some implementations. In diagram 700, computing system 710 may be used by a user to establish a connection with a server computing system. For example, a user may log in to the server computing system to activate a missing subtitle detection application to detect missing subtitles associated with a subtitle component. The missing subtitle detection application may be configured to include operations associated with a VAD network 130 in combination with operations associated with an AC network 230, as described with FIG. 1A to FIG. 6.

The computing system 710 is only one example of a suitable computing system, such as a mobile computing system, and is not intended to suggest any limitation as to the scope of use or functionality of the design. Neither should the computing system 710 be interpreted as having any dependency or requirement relating to any one or combination of components illustrated. The design is operational with numerous other general-purpose or special-purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 710 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 7, the computing system 710 may include, but are not limited to, a processing unit 720 having one or more processing cores, a system memory 730, and a system bus 721 that couples with various system components including the system memory 730 to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 710 typically includes a variety of computer program product. Computer program product can be any available media that can be accessed by computing system 710 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 710. Communication media typically embodies computer readable instructions, data structures, or program modules.

The system memory 730 may include computer storage media in the form of volatile and/or nonvolatile memory such as read only memory (ROM) 731 and random access memory (RAM) 732. A basic input/output system (BIOS) 733, containing the basic routines that help to transfer information between elements within computing system 710, such as during start-up, is typically stored in ROM 731. RAM 732 typically contains data and/or program modules that are immediately accessible to and/or presently being operated on by processing unit 720. By way of example, and not limitation, FIG. 7 also illustrates the RAM 732 to include operating system 734, application programs 735, other program modules 736, and program data 737.

The computing system 710 may also include other removable/non-removable volatile/nonvolatile computer storage media. By way of example only, FIG. 7 also illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computing system 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. The operating system 744, the application programs 745, the other program modules 746, and the program data 747 are given different numeric identification here to illustrate that, at a minimum, they are different copies.

A user may enter commands and information into the computing system 710 through input devices such as a keyboard 762, a microphone 763, and a pointing device 761, such as a mouse, trackball or touch pad or touch screen. Other input devices (not shown) may include a joystick, game pad, scanner, or the like. These and other input devices are often connected to the processing unit 720 through a user input interface 760 that is coupled with the system bus 721, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 790.

The computing system 710 may operate in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computing system 710. The logical connections depicted in FIG. 7 include a local area network (LAN) 771 and a wide area network (WAN) 773 but may also include other networks. Such networking environments are commonplace in offices, enterprise-wide computer networks, intranets and the Internet.

FIG. 7 includes a local area network (LAN) 771 and a wide area network (WAN) 773 but may also include other networks. Such networking environments are commonplace in offices, enterprise-wide computer networks, intranets and the Internet.

When used in a LAN networking environment, the computing system 710 may be connected to the LAN 771 through a network interface or adapter 770. When used in a WAN networking environment, the computing system 710 typically includes a modem 772 or other means for establishing communications over the WAN 773, such as the Internet. The modem 772, which may be internal or external, may be connected to the system bus 721 via the user-input interface 760, or other appropriate mechanism. In a networked environment, program modules depicted relative to the computing system 710, or portions thereof, may be stored in a remote memory storage device. By way of example, and not limitation, FIG. 7 illustrates remote application programs 785 as residing on remote computer 780. It will be appreciated that the network connections shown are exemplary and other means of establishing a communications link between the computers may be used.

It should be noted that some implementations may be carried out on a computing system such as that described with respect to FIG. 7. However, some implementations may be carried out on a server, a computer devoted to message handling, handheld devices, or on a distributed system in which different portions of the present design may be carried out on different parts of the distributed computing system.

Another device that may be coupled with the system bus 721 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 772 may employ a Wireless Application Protocol (WAP) to establish a wireless communication channel. The communication module 772 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Although implementations have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain implementations could include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method comprising:
   selecting a media presentation that includes a subtitle component and an audio component, the audio component including an audio sequence with associated audio timestamps, the subtitle component including subtitles with associated subtitle timestamps;
   dividing the audio sequence into a plurality of audio segments with an overlap between consecutive audio segments, each of the plurality of audio segments having a first duration;
   evaluating each of the plurality of audio segments using a voice activity detection (VAD) network to identify speech segments and non-speech segments;
   combining consecutive speech segments to form a plurality of combined speech segments, each of the plurality of the combined speech segments having a second duration, wherein the second duration is configured to be longer than the first duration;
   classifying each of the plurality of combined speech segments by an audio classification (AC) network to a category of sound from a plurality of categories of sound;

based on the classifying by the AC network, identifying one or more of the combined speech segments classified to a non-speech category of sound;
identifying one or more of the combined speech segments as speech based on the one or more combined speech segments classified to the non-speech category of sound;
determining first audio timestamp of the audio timestamps associated with the one or more combined speech segments identified as speech; and
generating a notification indicating missing subtitles from the subtitle component based on comparing the first audio timestamp associated with the one or more combined speech segments identified as speech and the subtitle timestamps associated with the subtitle component.

2. The method of claim 1, wherein the VAD network is configured to perform operations associated with a recurrent neural network, and wherein the AC network is configured to perform operations associated with a convolutional neural network.

3. The method of claim 2, wherein the determining the timestamps associated with the one or more combined speech segments identified as speech comprises determining a beginning timestamp and an ending timestamp for each of the one or more combined speech segments identified as speech, and wherein the generating of the notification indicating the missing subtitles from the subtitle component comprises comparing the beginning timestamp and the ending timestamp for each of the one or more combined speech segments identified as speech with a beginning timestamp and an ending timestamp for each subtitle in the subtitle component to identify the missing subtitles from the subtitle component.

4. A computer-implemented method comprising:
receiving an audio component and a subtitle component associated with a media presentation, the audio component including an audio sequence, the audio sequence divided into a plurality of audio segments;
evaluating the plurality of audio segments using a combination of a first neural network and a second neural network to identify refined speech segments associated with the audio sequence, the first neural network trained based on a plurality of languages, the second neural network trained based on a plurality of categories of sound, wherein the first neural network evaluates a first set of audio segments of the plurality of audio segments, each audio segment in the first set of audio segments having a first duration, and wherein the second neural network evaluates a second set of audio segments of the plurality of audio segments, each audio segment in the second set of audio segments having a second duration, the second duration being longer than the first duration;
determining timestamps associated with the identified refined speech segments; and
determining missing subtitles based on the timestamps associated with the identified refined speech segments and timestamps associated with subtitles included in the subtitle component.

5. The method of claim 4, wherein the first neural network is a recurrent neural network and the second neural network is a convolutional neural network, and wherein the evaluating of the plurality of audio segments using the combination of the first neural network and the second neural network comprises evaluating the plurality of audio segments using the first neural network in sequence with the second neural network.

6. The method of claim 5, wherein each of the plurality of audio segments has a first duration, and wherein an overlap exists between two consecutive audio segments.

7. The method of claim 6, wherein the recurrent neural network is configured to identify each of the plurality of audio segments as either a speech segment or a non-speech segment, wherein consecutive speech segments identified by the recurrent neural network are combined to generate a plurality of combined speech segments, each of the plurality of combined speech segments having a second duration, the second duration being longer than the first duration.

8. The method of claim 7, wherein each of the plurality of combined speech segments is non-overlapping with any other combined speech segment, and wherein the convolutional neural network is configured to classify each of the plurality of the combined speech segments to a category of sound to identify the refined speech segments.

9. The method of claim 4, wherein the first neural network is a recurrent neural network and the second neural network is a convolutional neural network, and wherein the first neural network is configured to evaluate the plurality of audio segments independently of the second neural network.

10. The method of claim 9, wherein consecutive audio segments in the first set of audio segments are partially overlapped, and wherein the recurrent neural network is configured to identify each audio segment in the first set of audio segments as either a speech segment or a non-speech segment.

11. The method of claim 10, wherein the convolutional neural network is configured to classify each audio segment in the second set of audio segments to a category of sound from a plurality of categories of sound and to identify whether an audio segment in the second set of audio segment is a speech segment or a non-speech segment based on a probability value associated with a category of sound.

12. The method of claim 11, wherein the speech segments associated with the first set of audio segments and the speech segments associated with the second set of audio segments are used to identify the refined speech segments associated with the audio sequence.

13. A system comprising:
memory configured to store computer-executable instructions; and
at least one computer processor configured to access the memory and execute the computer-executable instructions to:
receive an audio component and a subtitle component associated with a media presentation, the audio component including an audio sequence, the audio sequence divided into a plurality of audio segments;
evaluate the plurality of audio segments using a combination of a first neural network and a second neural network to identify refined speech segments associated with the audio sequence, the first neural network trained based on a plurality of languages, the second neural network trained based on a plurality of categories of sound, wherein the first neural network evaluates a first set of audio segments of the plurality of audio segments, each audio segment in the first set of audio segments having a first duration, and wherein the second neural network evaluates a second set of audio segments of the plurality of audio segments, each audio segment in the second set of audio segments having a second duration, the second duration being longer than the first duration;

determine timestamps associated with the identified refined speech segments; and determine missing subtitles based on the timestamps associated with the identified refined speech segments and timestamps associated with subtitles included in the subtitle component.

14. The system of claim 13, wherein the first neural network is a recurrent neural network and the second neural network is a convolutional neural network, and wherein the instructions to evaluate of the plurality of audio segments using the combination of the first neural network and the second neural network comprises instructions to evaluate the plurality of audio segments using the first neural network in sequence with the second neural network.

15. The system of claim 14, wherein each of the plurality of audio segments evaluated by the recurrent neural network has a first duration, and wherein an overlap exists between two consecutive audio segments, and wherein the recurrent neural network is configured to identify each of the plurality of audio segments as either a speech segment or a non-speech segment.

16. The system of claim 15, wherein consecutive speech segments identified by the recurrent neural network are combined to generate a plurality of combined speech segments, each of the plurality of combined speech segments having a second duration, the second duration being longer than the first duration.

17. The system of claim 16, wherein each of the plurality of combined speech segments is non-overlapping with any other combined speech segment, and wherein the convolutional neural network is configured to classify each of the plurality of the combined speech segments to a category of sound to identify the refined speech segments.

18. The system of claim 13, wherein the first neural network is a recurrent neural network and the second neural network is a convolutional neural network, wherein the first neural network is configured to evaluate the plurality of audio segments independently of the second neural network.

19. The system of claim 18, wherein consecutive audio segments in the first set of audio segments are partially overlapped, and wherein the recurrent neural network is configured to identify each audio segment in the first set of audio segments as either a speech segment or a non-speech segment, wherein the convolutional neural network is configured to classify each audio segment in the second set of audio segments to a category of sound from a plurality of categories of sound and to identify speech segments and non-speech segments from the audio segments associated with the second set of audio segments based on classified category of sound associated with each of the audio segments in the second set of audio segments, and wherein the speech segments associated with the first set of audio segments and the speech segments associated with the second set of audio segments are used to identify the refined speech segments associated with the audio sequence.

* * * * *